US007117042B2

(12) United States Patent
Morita

(10) Patent No.: US 7,117,042 B2
(45) Date of Patent: Oct. 3, 2006

(54) SEMICONDUCTOR DEVICE AND METHOD FOR CONTROLLING THE SAME

(75) Inventor: Akira Morita, Suwa (JP)

(73) Assignee: Seiko Epson Corporation, Tokyo (JP)

(*) Notice: Subject to any disclaimer, the term of this patent is extended or adjusted under 35 U.S.C. 154(b) by 126 days.

(21) Appl. No.: 10/891,197

(22) Filed: Jul. 15, 2004

(65) Prior Publication Data

US 2005/0043823 A1 Feb. 24, 2005

(30) Foreign Application Priority Data

Jul. 18, 2003 (JP) ............................ 2003-277026

(51) Int. Cl.
*G05B 19/18* (2006.01)
*G05B 11/01* (2006.01)

(52) U.S. Cl. ............................ 700/7; 700/11; 700/23; 700/25; 700/39; 710/1; 710/2; 710/5; 710/100; 318/34; 318/600; 318/602

(58) Field of Classification Search .................... 700/1, 700/7-8, 11, 23-25; 710/39, 1, 2, 5, 100; 318/602, 600, 34; 341/143; 365/4, 230.06; 714/789, 791
See application file for complete search history.

(56) References Cited

U.S. PATENT DOCUMENTS 4,407,016 A * 9/1983 Bayliss et al. ................ 710/3
5,621,800 A * 4/1997 Weng et al. ................ 380/266
6,115,763 A * 9/2000 Douskey et al. .............. 710/72
6,487,617 B1 * 11/2002 Gates ......................... 710/100

FOREIGN PATENT DOCUMENTS

| | | |
|---|---|---|
| JP | A 62-160538 | 7/1987 |
| JP | A 10-97472 | 4/1998 |
| JP | A 2001-222249 | 8/2001 |

OTHER PUBLICATIONS

U.S. Appl. No. 10/886,588, filed Jul. 9, 2004, Morita et al.
U.S. Appl. No. 09/911,829, Jul. 25, 2001, Tamura.
U.S. Appl. No. 10/886,588, Jul. 9, 2004, Morita et al.

* cited by examiner

*Primary Examiner*—Ramesh Patel
(74) *Attorney, Agent, or Firm*—Oliff & Berridge, PLC

(57) ABSTRACT

A semiconductor device, which is controlled based on a control signal corresponding to control data includes: a control register in which the control data is set; a sequencer which performs read control of a first control command on a nonvolatile memory in which the first control command is stored; a first command bus to which the first control command read from the nonvolatile memory is output; and a first decoder which decodes the first control command of the first command bus. The sequencer cyclically performs read control of the first control command on the nonvolatile memory, and sets the control data corresponding to the first control command in the control register each time the first decoder decodes the first control command output to the first command bus.

19 Claims, 18 Drawing Sheets

FIG. 10

| | | |
|---|---|---|
| COMMON BLOCK | 1 | AH0 |
| FIRST BLOCK | 1/0 | AH1 |
| SECOND BLOCK | 1/0 | AH2 |
| ⋮ | ⋮ | ⋮ |
| N-TH BLOCK | 1/0 | AHN |

SEMICONDUCTOR DEVICE AND METHOD FOR CONTROLLING THE SAME

Japanese Patent Application No. 2003-277026, filed on Jul. 18, 2003, is hereby incorporated by reference in its entirety.

BACKGROUND OF THE INVENTION

The present invention relates to a semiconductor device and a method for controlling the same.

An electronic instrument such as a portable telephone is reduced in size by providing a liquid crystal system in the electronic instrument. A further reduction of power consumption can be realized by strictly performing drive control using a driver (integrated circuit or semiconductor device in a broad sense) which drives a liquid crystal panel which makes up the liquid crystal system.

A control register is provided in the driver. Drive control corresponding to control data is enabled by setting the control data in the control register, whereby further strict drive control can be realized. As examples of the control register, a control register for setting a region to be displayed, selecting the data line to be driven, selecting the shift direction of display data to be supplied, setting display output timing, or the like can be given.

The driver is connected with a micro processor unit (hereinafter abbreviated as "MPU") (display controller). As disclosed in Japanese Patent Application Laid-open No. 2001-222249, the MPU sets the control data in the control register of the driver at the time of power-on or initialization or during a display period. The driver generates a control signal set in the control register, and performs drive control based on the control signal.

BRIEF SUMMARY OF THE INVENTION

One aspect of the present invention relates to a semiconductor device which is controlled based on a control signal corresponding to control data which is set by a device outside the semiconductor device, the semiconductor device including:

a control register in which the control data is set;

a sequencer which performs read control of a first control command on a nonvolatile memory in which the first control command is stored;

a first command bus to which the first control command read from the nonvolatile memory is output; and a first decoder which decodes the first control command of the first command bus, wherein the sequencer cyclically performs read control of the first control command on the nonvolatile memory, and sets the control data corresponding to the first control command in the control register each time the first decoder decodes the first control command output to the first command bus.

Another aspect of the present invention relates to an electronic instrument including the above semiconductor device.

A further aspect of the present invention relates to a method for controlling a semiconductor device based on a control signal corresponding to control data which is set by a device outside the semiconductor device, the method including:

cyclically performing read control of a first control command on a nonvolatile memory in which the first control command is stored;

setting the control data corresponding to the first control command in a control register each time the first control command read from the nonvolatile memory is decoded; and generating the control signal based on a content of the control register.

BRIEF DESCRIPTION OF THE SEVERAL VIEWS OF THE DRAWING

FIG. 10 is an explanatory diagram of an example of a read control register of a data driver.

DETAILED DESCRIPTION OF THE EMBODIMENT

Figure 1:
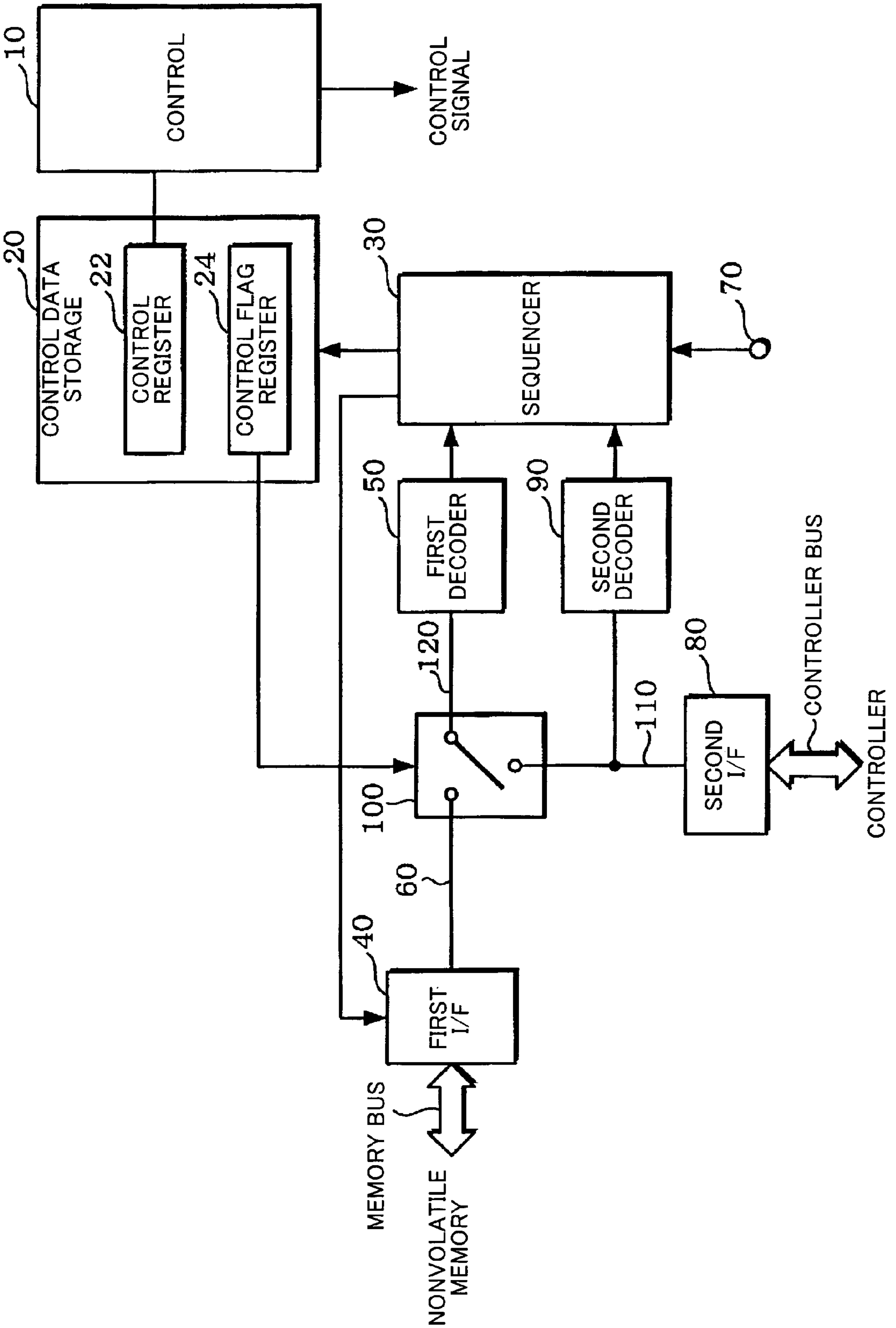
FIG. 1 is a block diagram showing an outline of an essential portion of a configuration of a semiconductor device in an embodiment of the present invention.

Embodiments of the present invention are described below. Note that the embodiments described hereunder do not in any way limit the scope of the invention determined by the claims laid out herein. Note also that all of the elements described below should not be taken as essential requirements for the present invention.

Generally, a high voltage is necessary for driving a liquid crystal. Therefore, noise accompanying drive of the liquid crystal tends to occur in a driver which drives the liquid crystal. Therefore, there may be a case where the contents of the control register in the driver are rewritten due to noise occurring in the driver.

A method of increasing tolerance to noise by changing the manufacturing process or layout is effective against occurrence of noise. However, the contents of the control register are not frequently rewritten. Moreover, the contents of the control register are generally referred to only at the time of power-on or initialization. Specifically, even if the contents of the control register are rewritten, the operation of the system rarely lapses into a fatal situation. Therefore, there may be a case where it is not appropriate to cause an increase in cost by changing the manufacturing process.

On the other hand, if the contents of the control register are rewritten in a display driver, an image to be displayed may become incorrect. Therefore, it is necessary to take certain measures.

As described above, it is desirable that a driver which enables stable control by increasing tolerance to noise at low cost be provided. It is also desirable that tolerance to noise be increased at low cost while realizing control of the driver by the MPU (display controller).

According to the following embodiments, a semiconductor device which enables stable control by increasing tolerance to noise using an inexpensive manufacturing process, and a method for controlling the same can be provided.

One embodiment of the present invention provides a semiconductor device which is controlled based on a control signal corresponding to control data which is set by a device outside the semiconductor device, the semiconductor device including:

a control register in which the control data is set;

a sequencer which performs read control of a first control command on a nonvolatile memory in which the first control command is stored;

a first command bus to which the first control command read from the nonvolatile memory is output; and a first decoder which decodes the first control command of the first command bus, wherein the sequencer cyclically performs read control of the first control command on the nonvolatile memory, and sets the control data corresponding to the first control command in the control register each time the first decoder decodes the first control command output to the first command bus.

In this embodiment, read control of the single control command on the nonvolatile memory, in which the control command for controlling the semiconductor device is stored, is cyclically performed. The control command is decoded by the first decoder. The control data corresponding to the control command is repeatedly set in the control register each time the control command is decoded by the first decoder. The semiconductor device is controlled based on the control signal corresponding to the control data set in the control register.

This enables the original contents of the control register to be recovered after a certain period has elapsed even if the contents of the control register are changed due to noise or the like. Therefore, an incorrect operation caused by occurrence of noise can be reduced by using an inexpensive manufacturing process without taking measures against noise using a high voltage process.

This semiconductor device may include an external setting terminal which is set in a first or second state, the sequencer may perform read control of the first control command on the nonvolatile memory when the external setting terminal is set in the first state.

With this embodiment, cyclic read control of the control command on the nonvolatile memory can be started when power is supplied to the semiconductor device, for example. Therefore, a configuration in which a controller for starting read control of the control command or the like is unnecessary can be realized.

This semiconductor device may include:

a control flag register in which a control flag is set;

a second command bus to which a second control command is output;

a second decoder which decodes the second control command of the second command bus; and a switch circuit which connects one of the first and second command buses with the first decoder, the switch circuit may output a control command of one of the first and second command buses to the first decoder based on the control flag, and the sequencer may set the control flag in the control flag register based on a decode result of the second decoder, and may set the control data corresponding to the control command of one of the first and second command buses in the control register based on a decode result of the first decoder.

With this semiconductor device, the switch circuit may switch a connection setting of the switch circuit from a state in which the switch circuit connects the first command bus with the first decoder to a state in which the switch circuit connects the second command bus with the first decoder, on condition that the control flag is set or reset based on the decode result of the second decoder.

With this embodiment, control corresponding to the control command output from a controller can be performed in a period in which read control of the nonvolatile memory is cyclically performed, for example. Moreover, since the second decoder merely decode the control command for performing switch control of the switch circuit, it may be unnecessary to provide a plurality of decoders on the same scale as the first decoder, whereby an increase in circuit scale can be prevented.

With this semiconductor device, the switch circuit may connect the second command bus with the first decoder when the second decoder detects that the second control command is output to the second command bus.

With this embodiment, the scale of the second decoder can be reduced, whereby the cost of the semiconductor device can be reduced.

With this semiconductor device, the first command bus may be electrically connected with the nonvolatile memory.

With this semiconductor device, the second command may be connected with a controller which outputs the second control command.

With this semiconductor device, the nonvolatile memory may be an electrically erasable programmable read only memory (EEPROM).

This semiconductor device may include:

a display data register in which display data is fetched; and a data line driver circuit which drives a data line of a display section based on the display data fetched in the display data register, a display setting control command may be stored in the nonvolatile memory, and the second command bus may be connected with a display controller which outputs the second control command.

With this embodiment, a data driver which realizes a reduction of cost and enables strict control using the control command can be provided.

Another embodiment of the present invention provides an electronic instrument including the above semiconductor device.

A further embodiment of the present invention provides a method for controlling a semiconductor device based on a control signal corresponding to control data which is set by a device outside the semiconductor device, the method including:

cyclically performing read control of a first control command on a nonvolatile memory in which the first control command is stored;

setting the control data corresponding to the first control command in a control register each time the first control command read from the nonvolatile memory is decoded; and generating the control signal based on a content of the control register.

With this method for controlling a semiconductor device, read control of the first control command on the nonvolatile memory may be performed when an external setting terminal is set in a first state.

This method for controlling a semiconductor device may include:

decoding a first control command;

decoding a second control command;

decoding a control command of one of the first and second command buses corresponding to a control flag which is set based on a decode result of the second control command, the first control command being output to the first command bus and the second control command being output to the second command bus; and setting in the control register the control data corresponding to a control command of one of the first and second command buses.

The embodiments of the present invention are described below in detail with reference to the drawings.

1. Semiconductor Device

FIG. 1 shows an outline of an essential portion of a configuration of a semiconductor device in the present embodiment. Some of these blocks may be omitted.

The semiconductor device includes a control circuit 10. The control circuit 10 generates a control signal. Each circuit which makes up the semiconductor device is controlled based on the control signal generated by the control circuit 10. The control circuit 10 generates the control signal corresponding to control data stored in a control data storage section 20. The control data storage section 20 includes a control register 22. The control data is set in the control register 22 by a device outside the semiconductor device, for example.

The semiconductor device includes a sequencer 30. The sequencer 30 performs control for setting the control data in the control register 22. The function of the sequencer 30 is realized by hardware which is realized by an application specific integrated circuit (ASIC) or the like, or by a read-only memory (ROM) which stores firmware and a central processing unit (hereinafter abbreviated as "CPU").

The semiconductor device includes a first interface (hereinafter abbreviated as "I/F") circuit 40, and a first decoder 50. The first I/F circuit 40 can be electrically connected with the first decoder 50 through a first command bus 60. The function of the first I/F circuit 40 may be realized by an input/output (I/O) cell (input circuit (input buffer), an output circuit (output buffer), or an input/output circuit (input/output buffer)), an electrode (pad), and a terminal (pin) of the semiconductor device. The first I/F circuit 40 is electrically connected with a nonvolatile memory (not shown).

A control command (command) read from the nonvolatile memory (not shown) is output to the first command bus 60 through the first I/F circuit 40.

The first decoder 50 decodes the control command output to the first command bus 60.

In this semiconductor device, the sequencer 30 performs read control of a first control command on the nonvolatile memory in which the first control command is stored.

Figure 2:
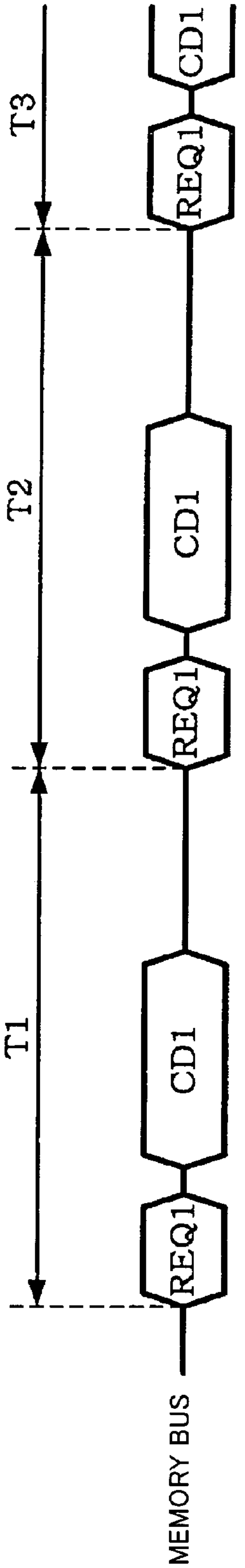
FIG. 2 is a timing diagram illustrating read control of a first control command performed by a sequencer.

FIG. 2 shows an example of a timing diagram illustrating read control of the first control command performed by the sequencer 30.

The sequencer 30 cyclically performs control for reading the first control command on the nonvolatile memory (not shown) through the first I/F circuit 40. As shown in FIG. 2, the sequencer 30 cyclically outputs a read request REQ1 to the nonvolatile memory, and fetches control data CD1 read from the nonvolatile memory corresponding to the read request REQ1 into the semiconductor device.

The cycle of read control performed by the sequencer 30 may be regular (T1=T2=. . . ) or irregular (T1≠T2≠T3 . . . ). It suffices that the first control command be read within a given period and that read control of the single first control command be repeatedly performed. Read control may be performed through the first command bus 60 and the first I/F circuit 40.

FIG. 2 shows the case where read control of the first control command is cyclically performed. However, read control of a plurality of control commands may be cyclically performed.

The first control command read from the nonvolatile memory (not shown) by read control performed by the sequencer 30 is output to the first command bus 60 through the first I/F circuit 40. The first decoder 50 is electrically connected with the first command bus 60, whereby the first control command of the first command bus 60 is supplied to the first decoder 50. The first decoder 50 decodes the first control command of the first command bus 60.

The sequencer 30 sets the control data corresponding to the first control command in the control register 22 each time the first decoder 50 decodes the first control command output to the first command bus 60.

The control data corresponding to the control command may be data which accompanies the control command as the parameter of the control command, or may be data output to the command bus subsequent to the control command.

As described above, the sequencer 30 cyclically performs read control of the single control command on the nonvolatile memory in which the control command for controlling the semiconductor device is stored, and the control command is decoded by the first decoder 50. The control data corresponding to the control command is repeatedly set in the control register 22 each time the control command is decoded by the first decoder 50. This enables the original contents of the control register 22 to be recovered after a certain period has elapsed, even if the contents of the control register 22 are rewritten due to noise or the like. Therefore, an incorrect operation caused by occurrence of noise can be reduced by using an inexpensive manufacturing process, without taking measures against noise by using a high voltage process.

As the control command stored in the nonvolatile memory (not shown), a command for setting the product number or production lot number, a power-on setting command, or an initialization setting command can be given.

The semiconductor device may include an external setting terminal 70. The external setting terminal 70 is set in a first state or a second state. In more detail, the external setting terminal 70 is set in a state in which a given high-potential-side power supply voltage is applied to the external setting terminal 70 as the first state, or a state in which a given low-potential-side power supply voltage is applied to the external setting terminal 70 as the second state, for example. The sequencer 30 performs read control of the first control command on the nonvolatile memory (not shown) through the first I/F circuit 40 when the external setting terminal 70 is set in the first state (state in which the high-potential-side power supply voltage is applied, for example).

This enables cyclic read control of the control command on the nonvolatile memory to be started when power is supplied to the semiconductor device, irrespective of the contents the control register 22. Therefore, a configuration in which a controller for starting read control of the control command or the like is unnecessary can be realized.

The semiconductor device is preferably controlled by an MPU (controller in a broad sense). This is because optimum control corresponding to the operation condition or control which reflects operation information input by the user can be realized by using the controller.

If the first decoder 50 is always connected with the first command bus 60, the first decoder 50 can decode only the control command read from the nonvolatile memory. Therefore, the semiconductor device shown in FIG. 1 includes a second I/F circuit 80, a second decoder 90, and a switch circuit 100.

The second I/F circuit 80 is electrically connected with the switch circuit 100 through a second command bus 60. The first I/F circuit 40 is electrically connected with the switch circuit 100 through the first command bus 110. The switch circuit 100 connects one of the first and second command buses 60 and 110 with the first decoder 50. In more detail, the switch circuit 100 connects one of the first and second command buses 60 and 110 with a decoder bus 120. The decoder bus 120 is connected with the first decoder 50.

The switch circuit 100 is controlled based on a control flag set in the control flag register 24 included in the control data storage section 20. The control flag is set by the sequencer 30 based on the decode result of the second decoder 90. In more detail, the switch circuit 100 switches from a state in which the switch circuit 100 connects the first command bus 60 with the first decoder 50 to a state in which the switch circuit 100 connects the second command bus 110 with the first decoder 50 on condition that the control flag is set or reset based on the decode result of the second decoder 90.

The function of the second I/F circuit 80 may be realized by an input/output (I/O) cell (input circuit (input buffer), output circuit (output buffer), or an input/output circuit (input/output buffer)), an electrode (pad), and a terminal (pin) of the semiconductor device in the same manner as the first I/F circuit 40. The second I/F circuit 80 is electrically connected with the controller (MPU) (not shown).

A control command (command) output from the controller (not shown) is output to the second command bus 110 through the second I/F circuit 80.

The second decoder 90 decodes the control command output to the second command bus 110.

Figure 3:
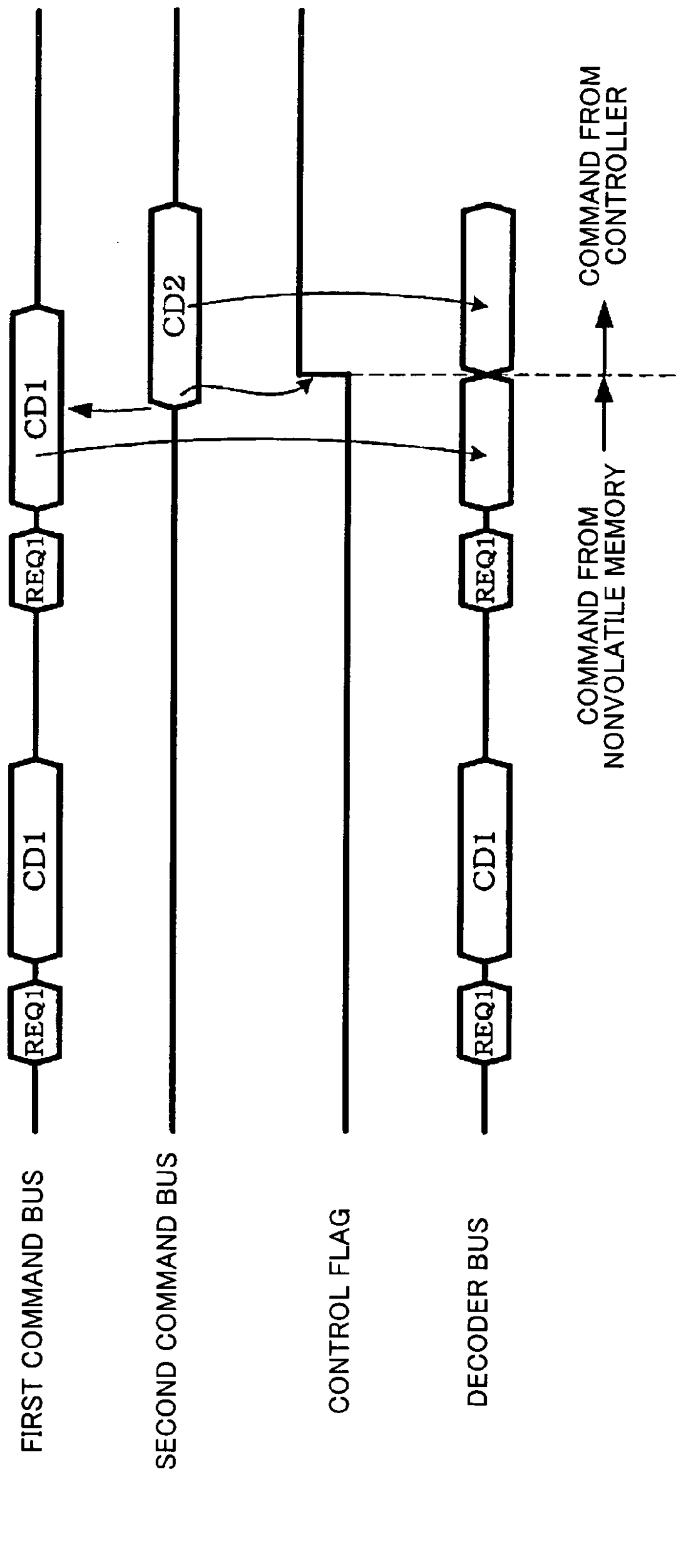
FIG. 3 is a timing diagram illustrating read control of a second control command performed by a sequencer.

FIG. 3 shows an example of a timing diagram illustrating read control of the second control command performed by the sequencer 30.

In FIG. 3, the sequencer 30 cyclically performs read control of the first control command on the nonvolatile memory in which the first control command is stored through the first command bus 60 and the first I/F circuit 40. Specifically, the control flag is set at “0” (reset state), and the switch circuit 100 connects the first decoder 50 with the first command bus 60. This allows the control data corresponding to the first control command to be cyclically and repeatedly set in the control register 22.

The controller outputs the second control command to the second command bus 110 through the second I/F circuit 80. The second decoder 90 decodes the second control command of the second command bus 110. The sequencer 30 sets the control flag corresponding to the decode result of the second decoder 90 in the control flag register 24 included in the control data storage section 20. For example, a control flag value “1” is set in the control flag register 24 (set state).

The switch circuit 100 switches from the state in which the switch circuit 100 connects the first decoder 50 with the first command bus 60 to the state in which the switch circuit 100 connects the first decoder 50 with the second command bus 60 based on the control flag set in the control flag register 24. As a result, the first decoder 50 decodes the control command of the second command bus 110. This enables control corresponding to the control command output from the controller to be performed in a period in which read control of the nonvolatile memory is cyclically performed. Moreover, since it suffices that the second decoder 90 merely decode the control command for performing switch control of the switch circuit 100, it is unnecessary to provide a plurality of decoders on the same scale as the first decoder 50, whereby an increase in the circuit scale can be prevented.

In this example, the switch circuit 100 switches to the state in which the switch circuit 100 connects the second command bus 110 with the first decoder 50 on condition that the control flag is set based on the decode result of the second decoder 90. However, the present invention is not limited thereto. The initial state of the control flag may be “1” (set state), and the switch circuit 100 switches to the state in which the switch circuit 100 connects the second command bus 110 with the first decoder 50 on condition that the control flag is reset based on the decode result of the second decoder 90.

The second decoder 90 may only detect that the second control command is output to the second command bus 110. In this case, the switch circuit 100 connects the second command bus 110 with the first decoder 50 on condition that the second decoder 90 detects that the second control command is output to the second command bus 110. This significantly reduces the circuit scale of the second decoder 90.

FIG. 1 illustrates the case where the semiconductor device in the present embodiment is connected with the nonvolatile memory and the controller (not shown) through the first and second I/F circuits 40 and 80 realized by the I/O cell, electrode, and terminal of the semiconductor device. However, the present invention is not limited thereto. The semiconductor device in the present embodiment may include at least one of the nonvolatile memory and the controller, for example. In this case, the functions of the first and second I/F circuits 40 and 80 may be realized by only the input buffer, output buffer, or input/output buffer.

2. Application Example of Data Driver

The case where the semiconductor device in the present embodiment is applied to a data driver is described below. The data driver drives a data line of a panel.

Figure 4:
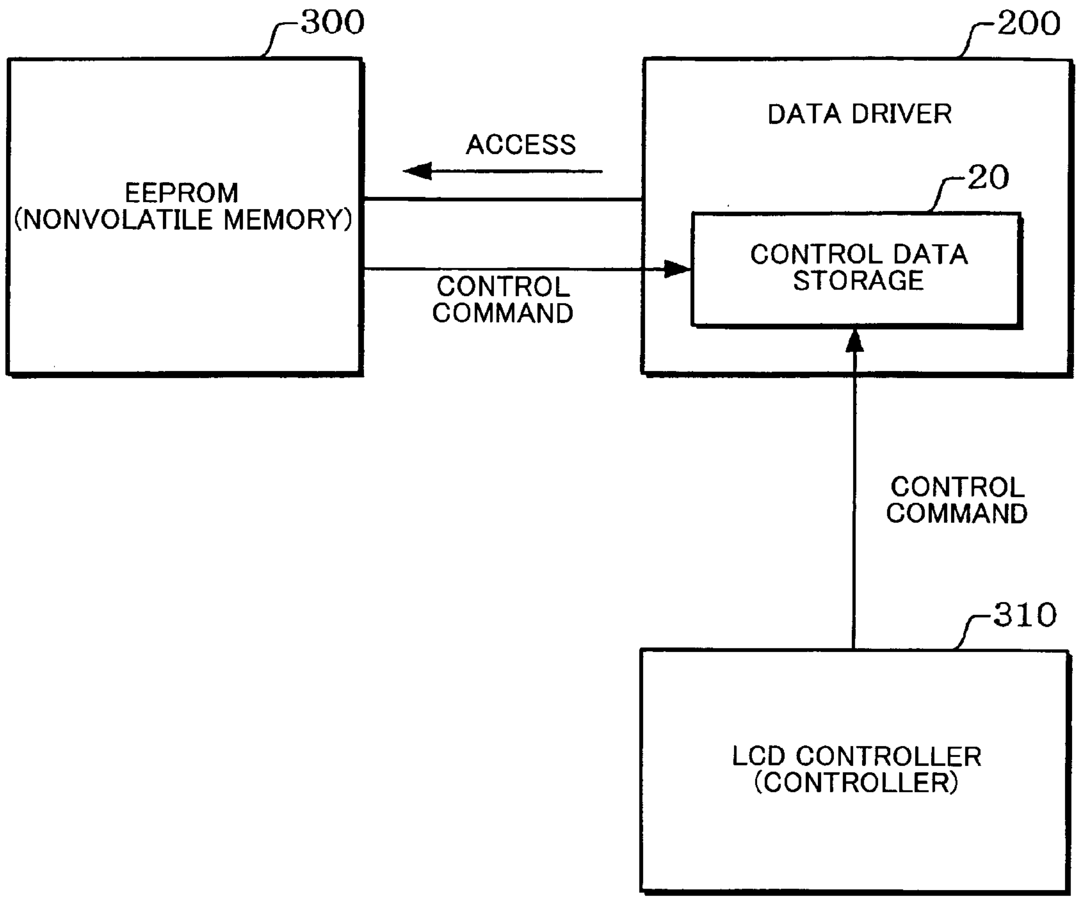
FIG. 4 is a schematic diagram showing a connection relationship among a data driver to which a semiconductor device in an embodiment of the present invention is applied, a nonvolatile memory, and a controller.

FIG. 4 schematically shows a connection relationship among a data driver to which the semiconductor device in the present embodiment is applied, a nonvolatile memory, and a controller.

A data driver 200 is connected with an electrically erasable programmable read only memory (EEPROM) 300 as a nonvolatile memory in which data can be electrically rewritten, and a liquid crystal display (hereinafter abbreviated as "LCD") controller 310 (display controller in a broad sense). The data driver 200 may include at least one of the EEPROM 300 and the LCD controller 310.

The data driver 200 includes each block of the semiconductor device shown in FIG. 1. Therefore, the data driver 200 cyclically performs read control of a display setting control command from the EEPROM 300. As the display setting control command, a command for selecting the data line to be driven or setting display timing can be given in addition to the power-on or initialization setting command.

The EEPROM 300 outputs the control command stored therein to the data driver 200 according to read control performed by the data driver 200. In the data driver 200, the control data corresponding to the control command output from the EEPROM 300 is stored in the control data storage section 20. The data driver 200 drives the liquid crystal based on the control command read from the EEPROM 300.

When the LCD controller 310 sets the control command (control command other than the control command read from the EEPROM 300) in the data driver 200, read control of the EEPROM 300 which has been cyclically performed is terminated. In the data driver 200, the control data corresponding to the control command set by the LCD controller 310 is set in the control data storage section 20. This causes the data driver 200 to drive the liquid crystal based on the control command from the LCD controller 310.

Figure 5:
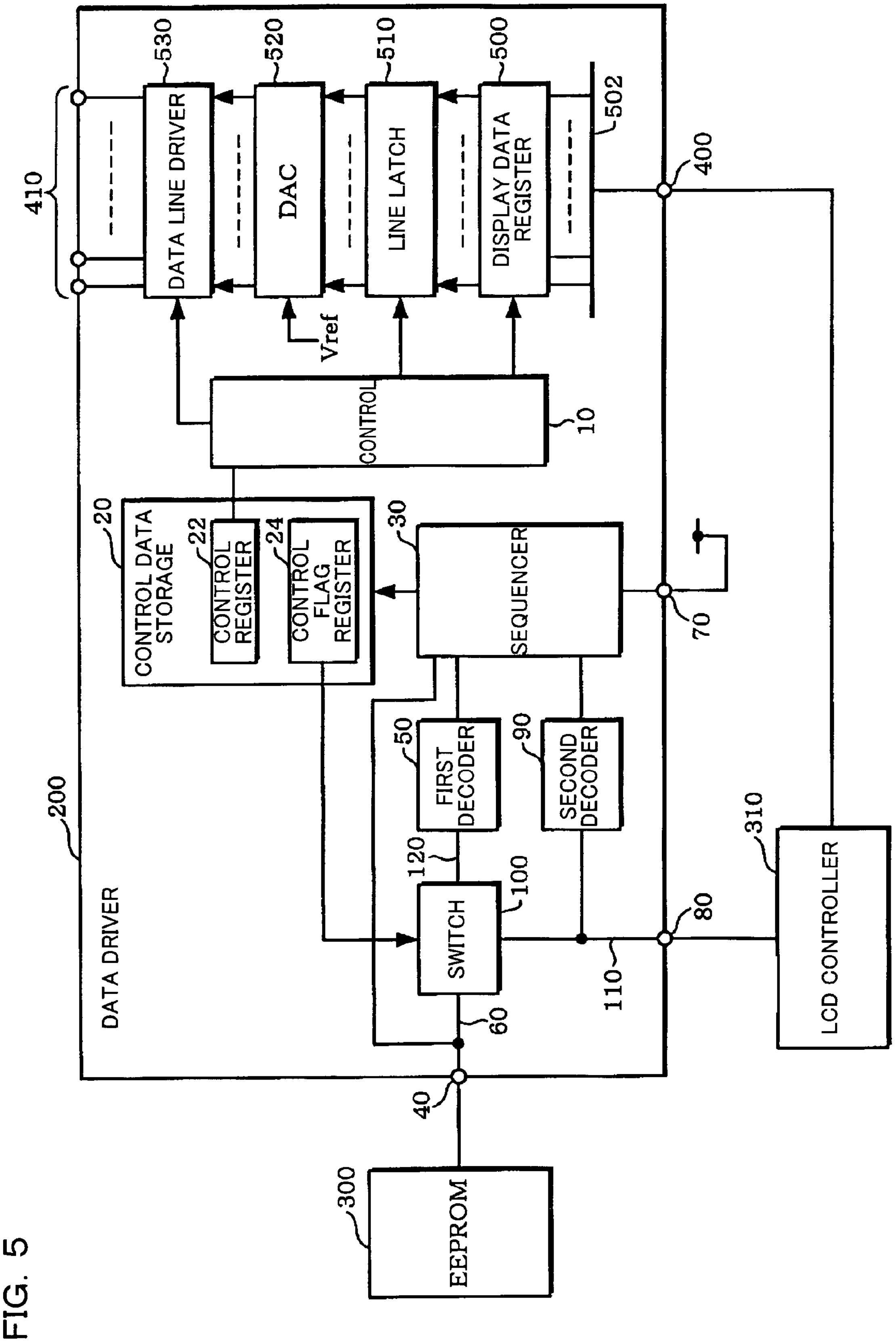
FIG. 5 is a block diagram showing an outline of a configuration of a data driver.

FIG. 5 shows an outline of a configuration of the data driver 200. In FIG. 5, sections the same as the sections of the semiconductor device shown in FIG. 1 are denoted by the same symbols. Description of these sections is appropriately omitted.

FIG. 5 shows the first and second I/F circuits 40 and 80 shown in FIG. 1 as terminals. The data driver 200 may have a configuration in which some of these elements are omitted.

The data driver 200 includes a display data input terminal 400 to which the display data for driving the data line is input, and a plurality of data line output terminals 410, each of the data line output terminals being connected with one of the data lines of the liquid crystal panel.

The display driver 200 includes a display data register 500, a line latch 510, a digital-to-analog converter (DAC) 520 (voltage select circuit in a broad sense), and a data line driver circuit 530.

The display data register 500 fetches the display data input through the display data input terminal 400. The display data is generated by the LCD controller 310. The LCD controller 310 serially supplies the display data in pixel units to the display data input terminal 400. The display data input to the data driver 200 through the display data input terminal 400 is output to a display bus 502. The display data register 500 is formed by shift registers. The display data register 500 fetches the display data on the display bus 502 in pixel units based on a shift clock signal which specifies shift timing of the shift register.

The line latch 510 latches the display data fetched in the display data register 500 based on a horizontal synchronization signal Hsync.

The DAC 520 outputs a drive voltage (gray-scale voltage) corresponding to the display data from the line latch 510 in data line units from a plurality of reference voltages, each of the reference voltages corresponding to the display data. In more detail, the DAC 520 decodes the display data from the line latch 510, and selects one of the reference voltages based on the decode result. The reference voltage selected by the DAC 520 is output to the data line driver circuit 530 as the drive voltage.

The data line driver circuit 530 includes a plurality of data output sections, each of the data output sections being provided corresponding to one of the data line output terminals. The data output section of the data line driver circuit 530 drives the data line based on the drive voltage output from the DAC 520.

The display data register 500, the line latch 510, the DAC 520, and the data line driver circuit 530 are controlled by the control circuit 10.

Figure 6:
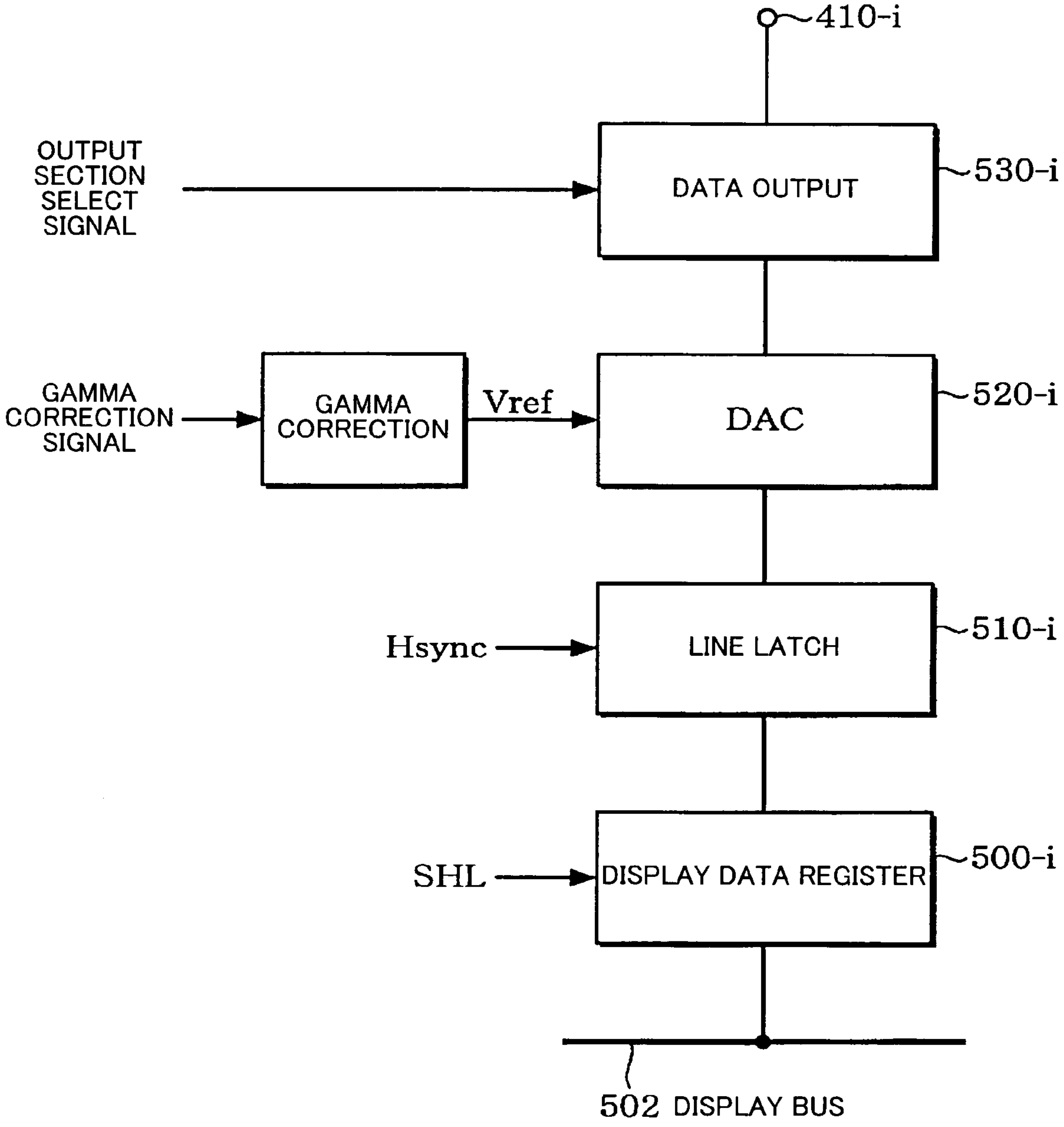
FIG. 6 is a block diagram showing an outline of a configuration of a data driver for one output.

FIG. 6 shows an outline of a configuration of the data driver 200 for one output.

FIG. 6 shows an example of the control signal output to each block by the control circuit 10.

The shift direction which specifies the arrangement order of the display data in pixel units sequentially fetched by the display data register 500 is controlled by the control circuit 10. When the control data for specifying the shift direction is set in the control register 22, the control circuit 10 outputs a shift direction control signal SHL (control signal in a broad sense) which indicates the shift direction corresponding to the control data. The control circuit 10 causes the display data in pixel units on the display bus 502 to be fetched in the display data register 500 in the order based on the shift direction control signal SHL.

The horizontal synchronization signal Hsync which specifies the fetch cycle of the line latch 510 depends on the number of data lines of the liquid crystal panel as the drive target. Therefore, when the control data which specifies the horizontal synchronization cycle is set in the control register 22, the control circuit 10 outputs a horizontal synchronization signal Hsync (control signal in a broad sense) in a cycle corresponding to the control data. The control circuit 10 causes the line latch 510 to latch the display data fetched in the display data register 500 based on the horizontal synchronization signal Hsync.

The reference voltages selected by the DAC 520 are gamma-corrected so that optimum gray-scale characteristics are obtained corresponding to the liquid crystal material for the liquid crystal panel as the drive target or the manufacturer of the liquid crystal panel. When the control data for performing gamma correction is set in the control register 22, the control circuit 10 outputs a gamma correction signal (control signal in a broad sense) for performing gamma correction corresponding to the control data. The reference voltages (Vref) after gamma correction based on the gamma correction signal are output to the DAC 520. The DAC 520 selects the reference voltage corresponding the display data from the reference voltages (Vref) after gamma correction, and outputs the selected reference voltage as the drive voltage.

The data line driver circuit 530 can realize a reduction of power consumption due to partial display by selecting the data output section. When the control data which designates the data output section to be selected is set in the control register 22, the control circuit 10 outputs an output section select signal (control signal in a broad sense) which selects the data output section corresponding to the control data. Only the data output section selected based on the output section select signal drives the data line connected with the data line output terminal based on the drive voltage output from the DAC 520. The output timing of the data output section is also controlled by the control circuit 10.

As described above, the control circuit 10 which controls each section of the data driver 200 outputs the control signal based on the control data set in the control register 22 in the control data storage section 20 in the same manner as in the semiconductor device shown in FIG. 1.

The EEPROM 300 which stores the control command for setting the control data in the control register 22 is described below.

Figure 7:
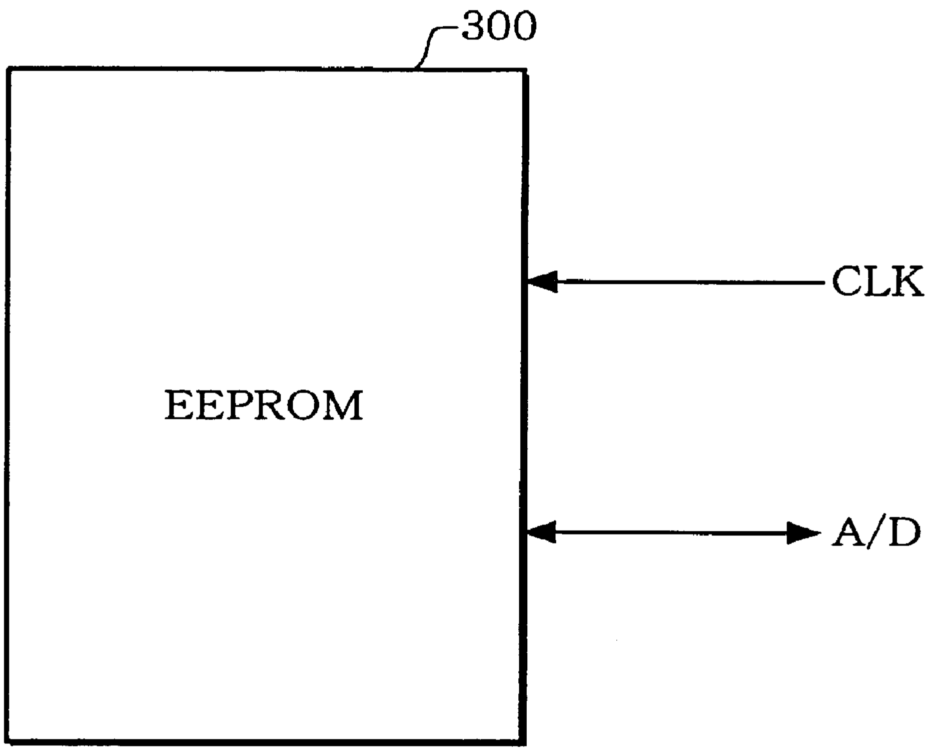
FIG. 7 is a block diagram showing an outline of a configuration of an EEPROM.

FIG. 7 shows an outline of a configuration of the EEPROM 300.

An address/data division bus and a clock line are connected with the EEPROM 300. The address/data division bus and the clock line are connected with the data driver 200.

Figure 8:
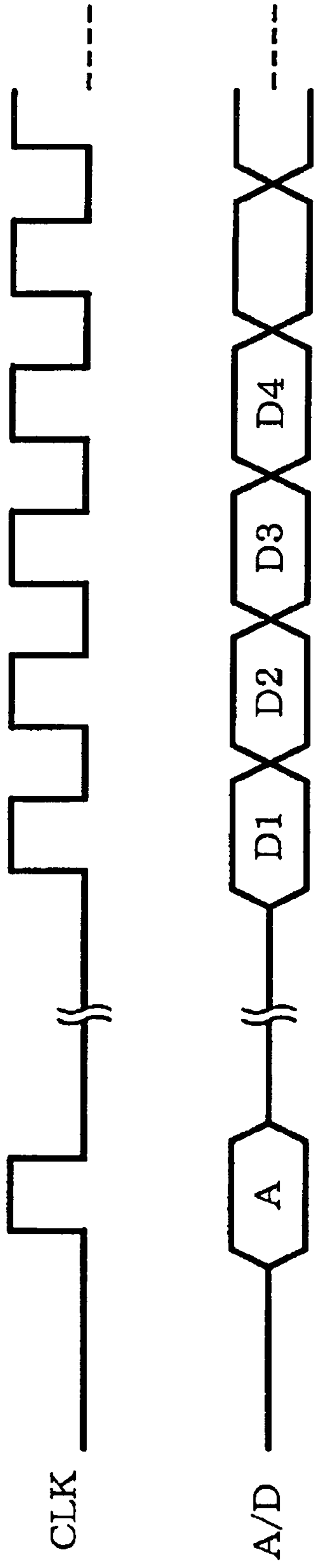
FIG. 8 is a timing diagram of an example of read control of the EEPROM shown in FIG. 7.

FIG. 8 shows a timing diagram of an example of read control of the EEPROM 300.

The data driver 200 sets address data A in the EEPROM 300 by outputting the address data A to the address/data division bus and outputting one clock pulse to the clock line, for example. The address data A is the address on the memory space of the EEPROM 300 in which the control command read by the data driver 200 is stored.

The data driver 200 sequentially supplies a clock signal to the clock line. The EEPROM 300 increments the fetched address data A in synchronization with the clock signal. The stored data (control data) corresponding to the address data A is output to the address/data division bus in synchronization with the clock signal on the clock line.

Figure 9:
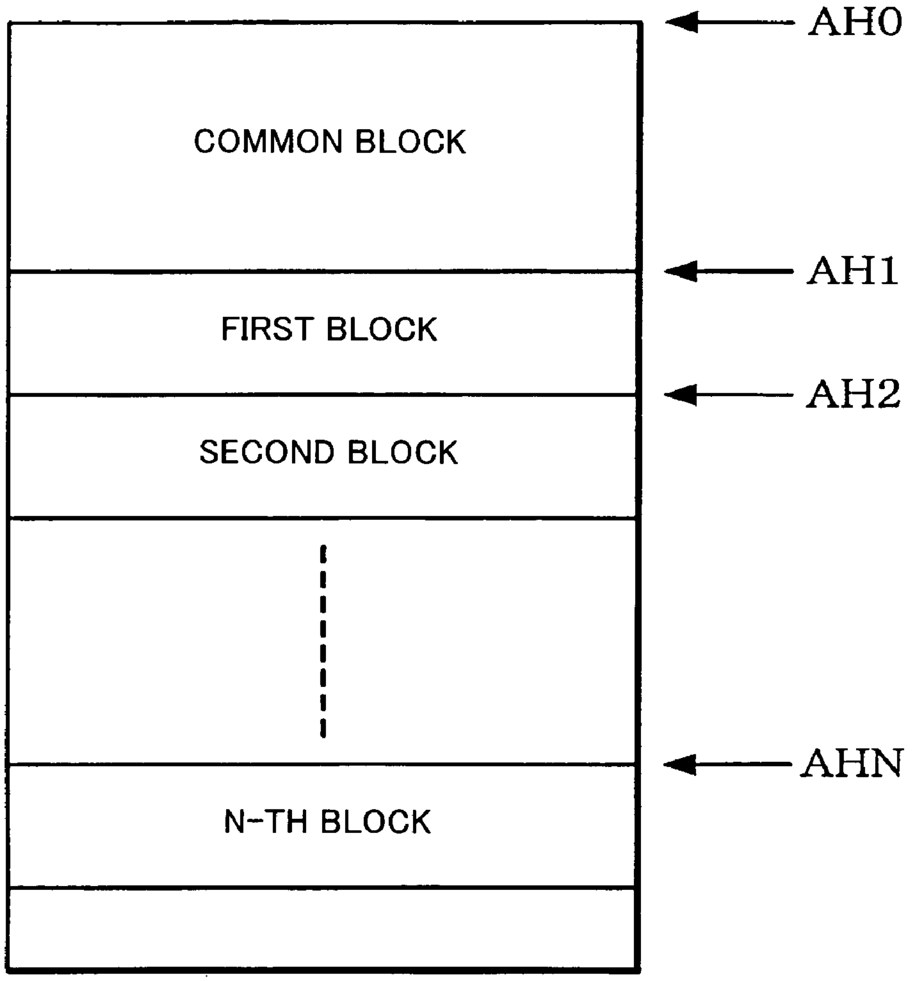
FIG. 9 is a diagram illustrating an example of a memory space of an EEPROM in which a control command is stored.

FIG. 9 shows an example of the memory space of the EEPROM 300 in which the control command is stored.

The memory space of the EEPROM 300 is divided into a plurality of blocks. Each block is specified by the head address. A common block is specified by a head address AH0. The first block is specified by a head address AH1. The second to N-th blocks (N is an integer of two or more) are specified by head addresses AH2 to AHN, respectively. At least one control command is stored in each block.

The data driver 200 performs read control of the control command in block units.

Figure 10:
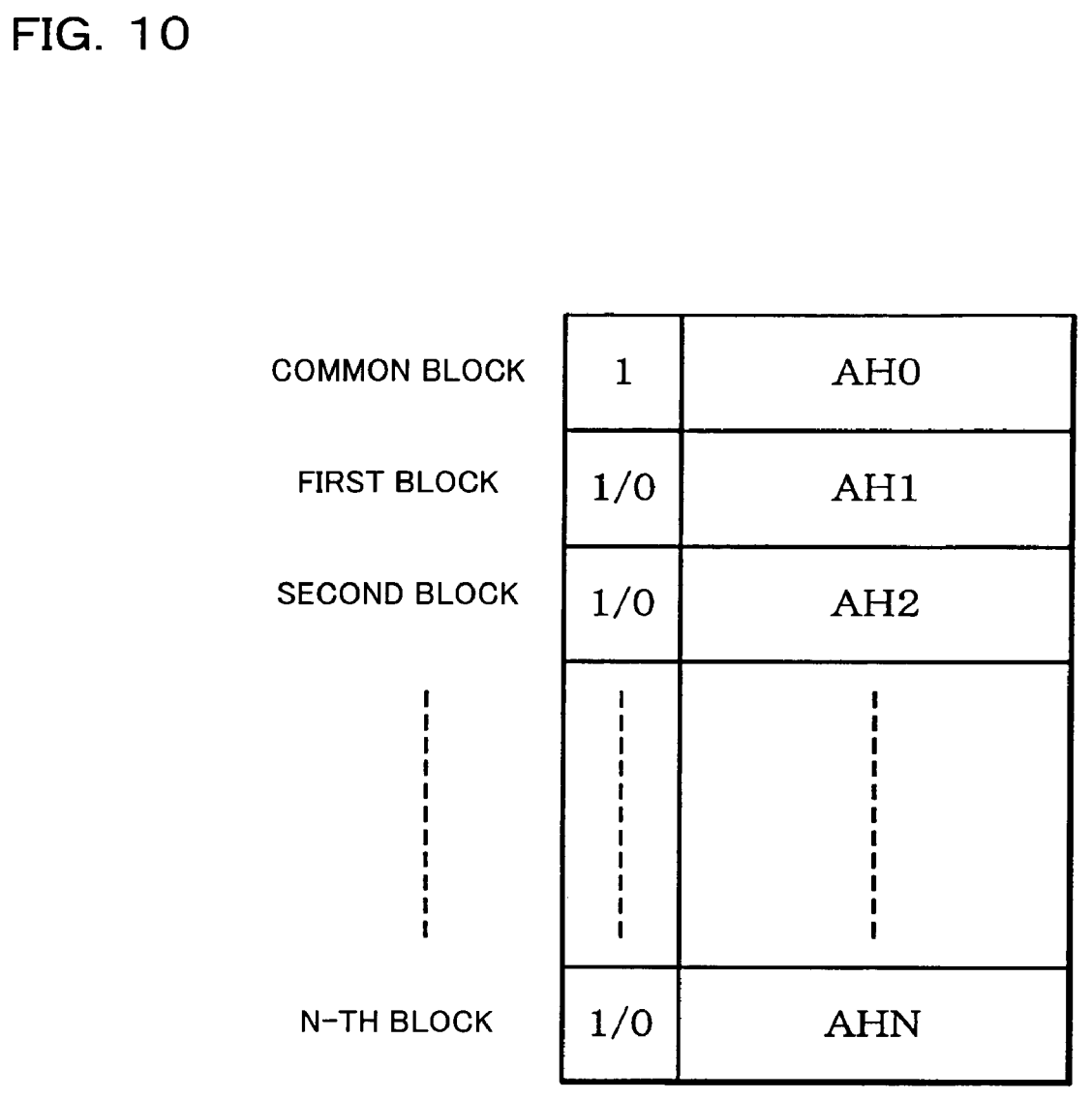

FIG. 10 shows an example of a read control register of the data driver 200.

The data driver 200 reads the control command stored in a desired block of the EEPROM 300 shown in FIG. 9 by setting the control command read control register shown in FIG. 10.

"1" or "0" is set in the read control register in block units. A given value is set in the read control register in the initial state, and the value set in the read control register is updated by the LCD controller 310.

A block in which the set value is "1" is cyclically read controlled by the data driver 200. A block in which the set value is "0" is not read controlled by the data driver 200.

The data driver 200 cyclically reads the control commands stored in the common block and the block of which the set value is set at "1" by fixing the set value corresponding to the common block at "1".

It is preferable to store a control command necessary at the time of power-on or initialization in the common block, for example. For example, a control command for controlling the shift direction or the horizontal scanning cycle peculiar to the system which is rarely changed after power-on is stored in the common block.

It is preferable to store a control command corresponding to each display control mode designated by the user after power-on in the first to N-th blocks. For example, a control command for changing the number of colors, a control command for changing the window size or partial display region by selecting the data output section, or a control command for controlling gamma correction for finely adjusting the gray-scale characteristics is stored in the first to N-th blocks.

In the case of cyclically performing read control of the EEPROM 300, the data driver 200 (sequencer 30 in a narrow sense) outputs the head address of the block which is set at "1" in the read control register to the EEPROM 300. The data driver 200 outputs the address to the EEPROM 300 in the number of clock signals corresponding to the size of the block. This causes the EEPROM 300 to increment from the head address in synchronization with the clock signal. The EEPROM 300 sequentially outputs the control command stored corresponding to the incremented address. The data driver 200 fetches the control command output from the EEPROM 300.

The data driver 200 can sequentially set the fetched control command in the corresponding control register by determining the arrangement of the control commands stored in each block in advance.

FIG. 10 illustrates the case where the size of each block is fixed. However, the size of each block may be set in the read control command. In this case, the data driver 200 (sequencer 30 in a narrow sense) outputs the clock signals in a number corresponding to the size of the block set at "1".

As described above, the control command group stored in the EEPROM 300 is read by access control by the data driver 200.

In the present embodiment, the control command from the LCD controller 310 can be fetched and reflected on control by the data driver 200 during a period in which the control command group stored in the EEPROM 300 is cyclically read. Therefore, the second I/F circuit 80, the second decoder 90, and the switch circuit 100 are provided. The control command from the LCD controller 310 can be supplied to the first decoder 50 through the switch circuit 100 by limiting the types of control commands decoded by the second decoder 90. Therefore, the control commands on the first and second command buses 60 and 110 can be decoded in common by the first decoder 50, whereby an increase in the circuit scale can be prevented.

In the present embodiment, the second decoder 90 may decode only a stop command which forcibly stops cyclic read control of the EEPROM 300, for example.

The operation of the sequencer 30 which realizes control performed by the data driver 200 is described below.

Figure 11:
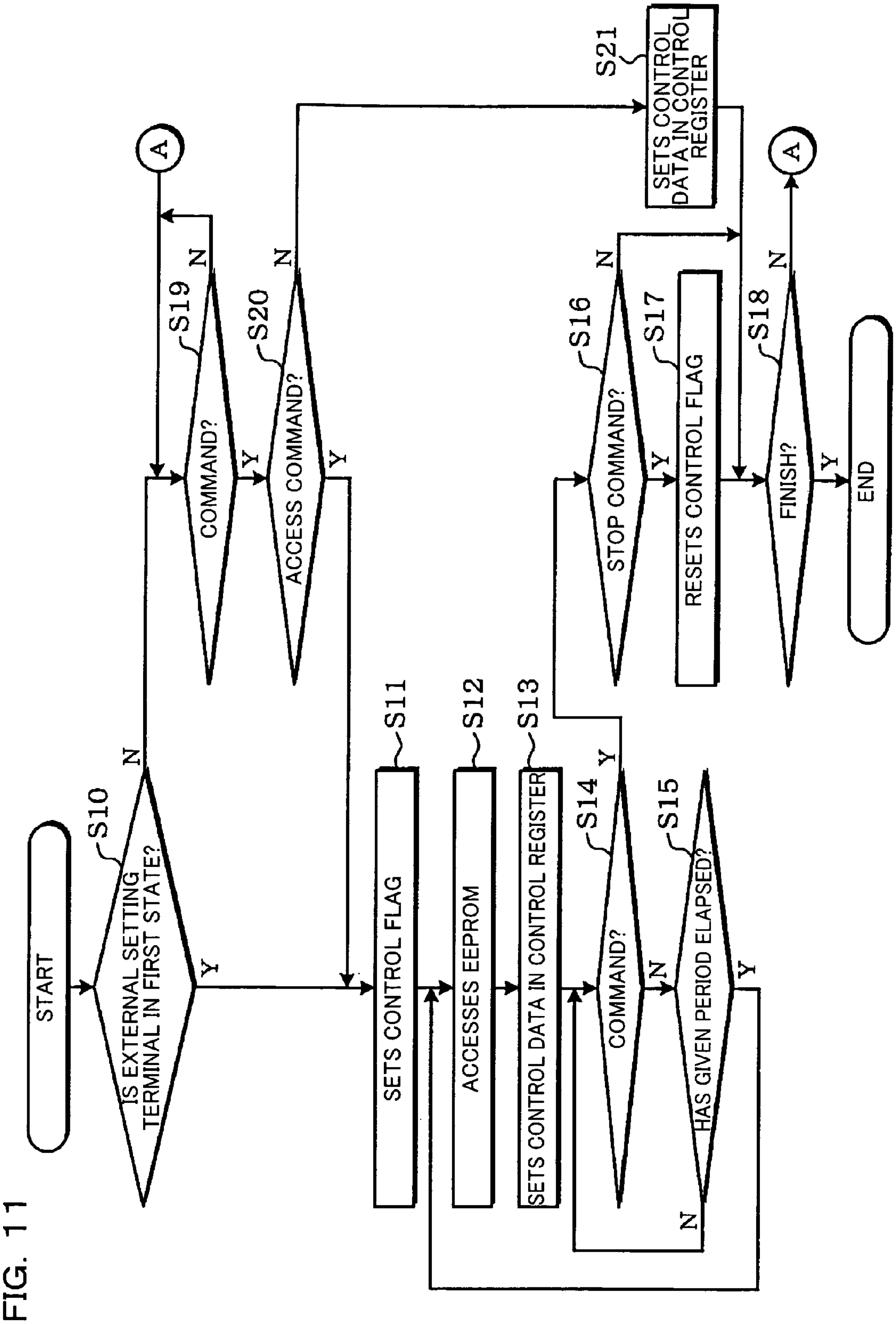
FIG. 11 is a flow diagram of an operation example of a sequencer.

FIG. 11 shows an operation flow of the sequencer 30.

The switch circuit 100 connects the second command bus 110 with the decoder bus 120 in the initial state.

The sequencer 30 detects whether or not the external setting terminal 70 is in a state in which the high-potential-side power supply voltage is applied to the external setting terminal 70 (first state) (step S10).

When the sequencer 30 detects that the external setting terminal 70 is in a state in which the high-potential-side power supply voltage is applied to the external setting terminal 70 (first state) (step S10: Y), the sequencer 30 sets the control flag of the control flag register 24 in the control data storage section 20 at "1" (step S11), and starts cyclic read control of the control command from the EEPROM 300 (step S12). The sequencer 30 starts access to the EEPROM 300 as shown in FIGS. 7 to 10, for example.

The data driver 200 fetches the control command corresponding to the access to the EEPROM 300 performed in the step S12. Since the control flag is set at "1" in the step S11, the switch circuit 100 connects the first command bus 60 with the decoder bus 120. Therefore, the first decoder 50 decodes the control command from the EEPROM 300, and sets the control data corresponding to the control command in the control register corresponding to the control command (step S13). In the case where a plurality of control commands are fetched corresponding to the access to the EEPROM 300 performed in the step S12, the first decoder 50 decodes each control command and sets the control data corresponding to the control command in the control register corresponding to the control command.

Whether or not another control command is output from the LCD controller 310 is detected (step S14). When it is detected that another control command is not output from the LCD controller 310 (step S14: N), the sequencer 30 detects whether or not a given period has elapsed (step S15). This period is the time which has elapsed after performing access control of the EEPROM 300 last time.

When the sequencer 30 detects that the given period has not elapsed in the step S15 (step S15: N), the operation is returned to the step S14. When the sequencer 30 detects that the given period has elapsed in the step S15 (step S15: Y), read control of the control command from the EEPROM 300 is performed again in the step S12. This allows the single control command to be cyclically read from the EEPROM 300.

When it is detected that another control command is output from the LCD controller 310 in the step S14 (step S14: Y), the sequencer 30 determines whether or not the control command output from the LCD controller 310 is the stop command which stops cyclic read control of the EEPROM 300 based on the decode result of the second decoder 90 (step S16).

When the sequencer 30 determines that the control command from the LCD controller 310 is the stop command (step 16: Y), the sequencer 30 resets the control flag to "0" (step S17).

When the sequencer 30 determines that the control command from the LCD controller 310 is not the stop command (step 16: N) or the control flag is reset in the step S17 (step S17), and the operation is finished (step S18: Y), a series of processing is terminated (END). When the operation is not finished (step S18: N), the operation is returned to the step S19.

When the sequencer 30 detects that the external setting terminal 70 is not in a state in which the voltage corresponding to the logical level H is applied to the external setting terminal 70 (first state) in the step S10 (step S10: N), the operation proceeds to the step S19.

In the step S19, whether or not another control command is output from the LCD controller 310 is detected in the same manner as in the step S14 (step S19). When it is detected that another control command is not output from the LCD controller 310 (step S19: N), the step S19 is repeatedly performed.

When it is detected that another control command is output from the LCD controller 310 in the step S19 (step S19: Y), the sequencer 30 determines whether or not the control command output from the LCD controller 310 is the access command which directs cyclic read control of the control command from the EEPROM 300 based on the decode result of the first decoder 50 (step S20).

When the sequencer 30 determines that the control command output from the LCD controller 310 is the access command (step S20: Y), the operation proceeds to the step S11, and the EEPROM 300 starts to be accessed.

When the sequencer 30 determines that the control command output from the LCD controller 310 is not the access command in the step S20 (step S20: N), the sequencer 30 sets the control data corresponding to the control command in the control register corresponding to the control command based on the decode result of the first decoder 50 (step S21), and proceeds to the step S18.

The sequencer 30 which enables the above-described operation may be realized only by hardware such as an ASIC. The sequencer 30 may be realized by a combination of a CPU and a ROM.

Figure 12:
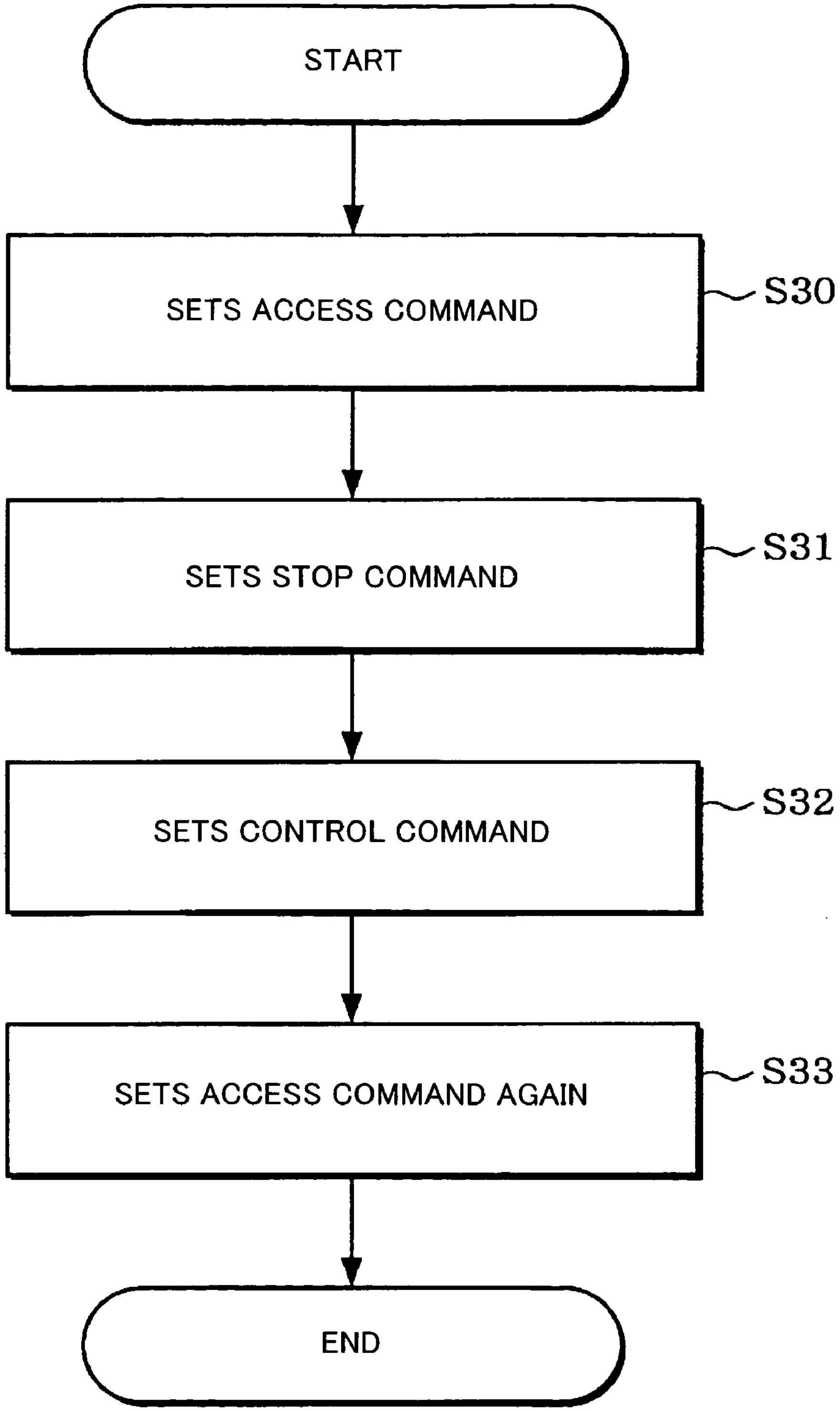
FIG. 12 is a flow diagram of an example of a method for setting control data in a data driver using a stop command.

FIG. 12 shows an example of a method for setting the control data in the data driver 200 using the stop command.

The access command for performing read control of the control command from the EEPROM 300 is set from the LCD controller 310 (step S30). The external setting terminal 70 may also be used as described above. This causes the control data to be cyclically set in the control register 22. Desired control data can be cyclically set by using the read control register shown in FIG. 10.

The stop command is set from the LCD controller 310 (step S31). This causes read control of the EEPROM 300 to stop.

Another control command is set from the LCD controller 310 (step S32). This control command is decoded by the first decoder 50 through the switch circuit 100. Therefore, control data corresponding to this control command is set in the control register 22.

The access command for performing read control of the control command from the EEPROM 300 is reset from the LCD controller 310 (step S33). This causes the control data to be cyclically set in the control register 22.

FIG. 11 illustrates the case where the second decoder 90 decodes only the stop command. However, the present invention is not limited thereto. For example, the second decoder 90 may decode a status read command for reading the contents of the control data storage section 20 in addition to the stop command.

Figure 13:
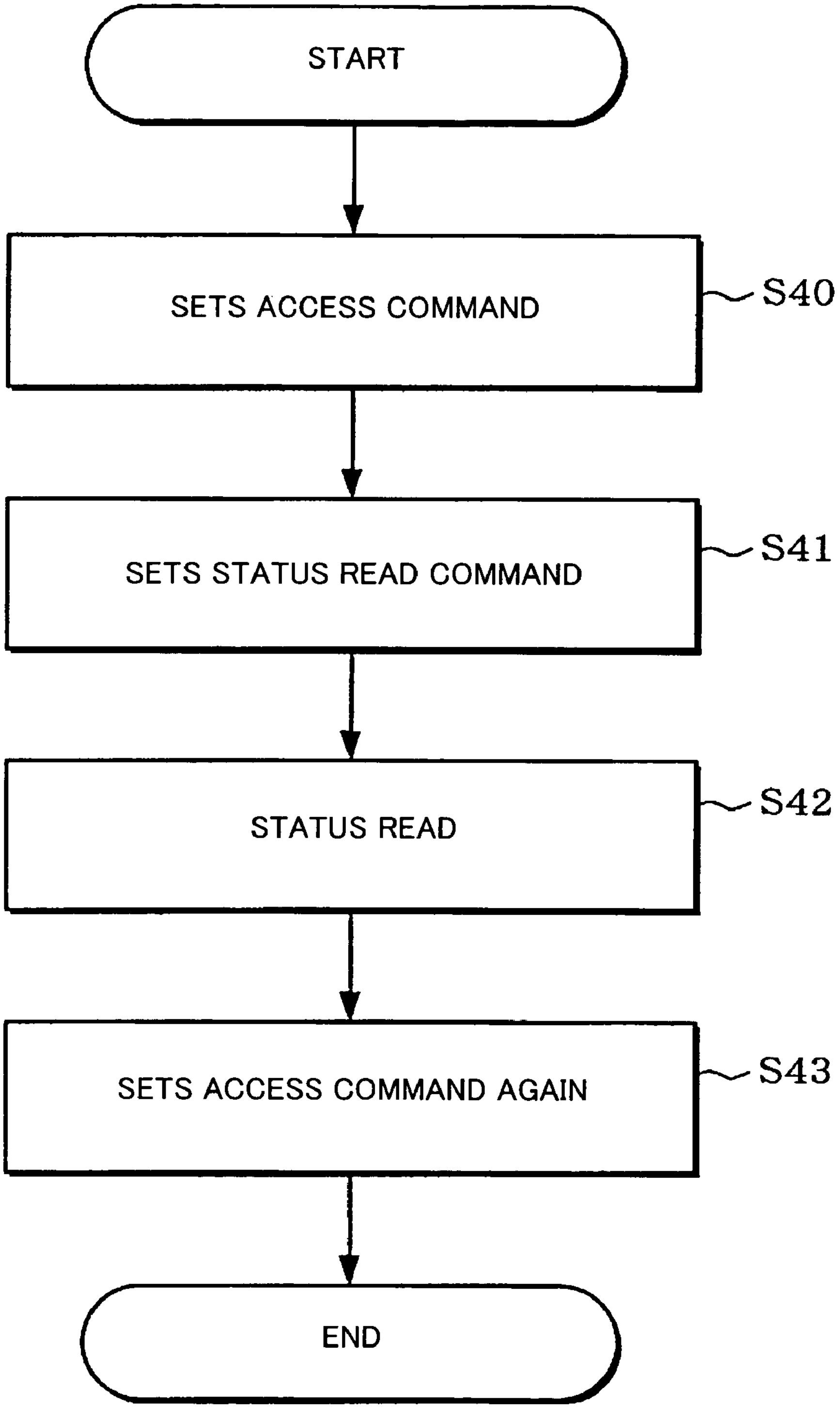
FIG. 13 is a flow diagram of an example of a method for setting control data in a data driver using a status read command.

FIG. 13 shows an example of a method for setting the control data in the data driver 200 using the status read command.

The access command for performing read control of the control command from the EEPROM 300 is set from the LCD controller 310 (step S40). The external setting terminal 70 may also be used as described above. This causes the control data to be cyclically set in the control register 22. Desired control data can be cyclically set by using the read control register shown in FIG. 10.

The status read command is set from the LCD controller 310 (step S41). This causes read control of the EEPROM 300 to stop.

When the status read command is set from the LCD controller 310, the status read command is decoded by the second decoder 90. The sequencer 30 outputs the contents of the control register 22 and the control flag register 24 stored in the control data storage section 20 to the LCD controller 310 (step S42).

The access command for performing read control of the control command from the EEPROM 300 is reset from the LCD controller 310 (step S43). This causes the control data to be cyclically set in the control register 22.

As described above, the second decoder 90 is provided in addition to the first decoder 50. The LCD controller 310 can perform another control by setting the control command, even in a period in which cyclic read control of the control command from the EEPROM 300 is performed, by reducing the number of types of control commands which can be decoded by the second decoder 90 in comparison with the first decoder 50.

Read control of the EEPROM 300 performed by the data driver 200 is not limited to that described with reference to FIGS. 7 to 10.

3. Application Example of Liquid Crystal System

A liquid crystal system to which the data driver 200 shown in FIG. 5 is applied is described below.

Figure 14:
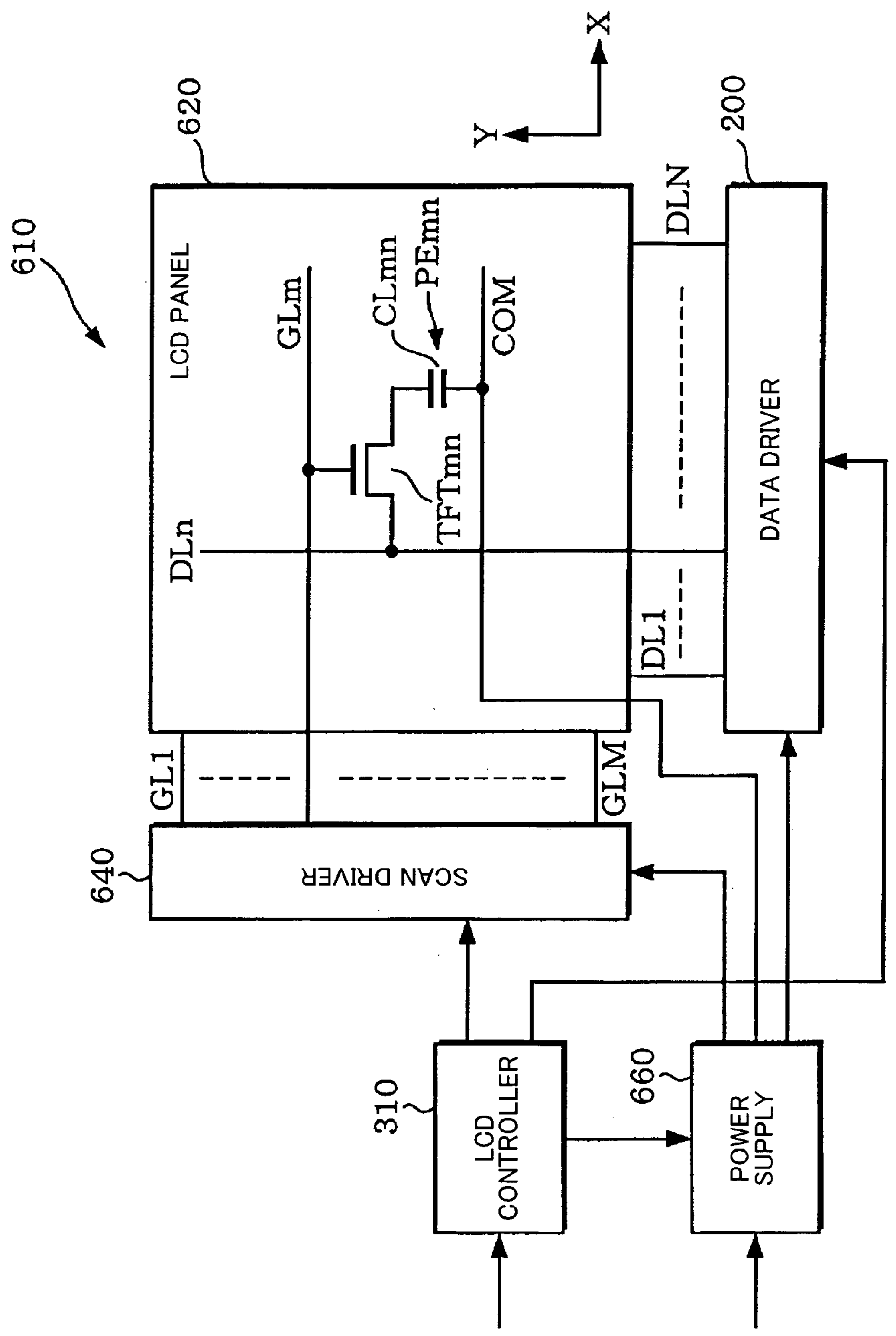
FIG. 14 is a block diagram showing a configuration example of a liquid crystal system in an embodiment of the present invention.

FIG. 14 shows an outline of a configuration of a liquid crystal system in the present embodiment. In FIG. 14, sections the same as the sections shown in FIG. 5 are denoted by the same symbols. Description of these sections is appropriately omitted.

A liquid crystal system may be incorporated in various electronic instruments such as a portable telephone, portable information instrument (PDA or the like), digital camera, projector, portable audio player, mass storage device, video camera, electronic notebook, or global positioning system (GPS).

In FIG. 14, a liquid crystal system 610 includes an LCD panel 620 (display panel in a broad sense; electro-optical device in a broader sense), the data driver 200 (column driver circuit), a scan driver 640 (gate driver or row driver circuit), the LCD controller 310, and a power supply circuit 660.

The liquid crystal system 610 does not necessarily include all of these circuit blocks. The liquid crystal system 610 may have a configuration in which a part of the circuit blocks is omitted.

The LCD panel 620 includes a plurality of scan lines (gate lines), each of the scan lines being provided in one of the rows, a plurality of data lines (source lines) which intersect the scan lines, each of the data lines being provided in one of the columns, and a plurality of pixels, each of the pixels being specified by one of the scan lines and one of the data lines. Each pixel includes a thin-film transistor (hereinafter abbreviated as "TFT") and a pixel electrode. The TFT is connected with the data line, and a pixel electrode is connected with the TFT.

In more detail, the LCD panel 620 is formed on a panel substrate such as a glass substrate. A plurality of scan lines GL1 to GLM (M is an integer of two or more; M is preferably three or more), arranged in the Y direction shown in FIG. 14 and extending in the X direction, and a plurality of data lines DL1 to DLN (N is an integer of two or more), arranged in the X direction and extending in the Y direction, are disposed on the panel substrate. A pixel PEmn is disposed at a position corresponding to the intersecting point of the scan line GLm ($1 \leqq m \leqq M$, m is an integer) and the data line DLn ($1 \leqq n \leqq N$, n is an integer). The pixel PEmn includes the thin-film transistor TFTmn and the pixel electrode.

A gate electrode of the thin-film transistor TFTmn is connected with the scan line GLm. A source electrode of the thin-film transistor TFTmn is connected with the data line DLn. A drain electrode of the thin-film transistor TFTmn is connected with the pixel electrode. A liquid crystal capacitor CLmn is formed between the pixel electrode and a common electrode COM which faces the pixel electrode through a liquid crystal element (electro-optical material in a broad sense). A storage capacitor may be formed in parallel with the liquid crystal capacitor CLmn. The transmissivity of the pixel changes corresponding to the voltage applied between the pixel electrode and the common electrode COM. A voltage VCOM supplied to the common electrode COM is generated by the power supply circuit 660.

The data driver 200 drives the data lines DL1 to DLN of the LCD panel 320 based on display data for one horizontal scanning period supplied in each horizontal scanning period. In more detail, the data driver 200 drives at least one of the data lines DL1 to DLN based on the display data.

The scan driver 640 scans the scan lines GL1 to GLM of the LCD panel 620. In more detail, the scan driver 640 consecutively selects the scan lines GL1 to GLM in one vertical period, and drives the selected scan line.

The LCD controller 310 outputs control signals to the data driver 200, the scan driver 640, and the power supply circuit 660 according to the contents set by a host such as a CPU (not shown). In more detail, the LCD controller 310 supplies an operation mode setting and a horizontal synchronization signal or a vertical synchronization signal generated therein to the data driver 200 and the scan driver 640, for example. The horizontal synchronization signal specifies the horizontal scanning period. The vertical synchronization signal specifies the vertical scanning period. The LCD controller 310 controls the power supply circuit 660 relating to polarity reversal timing of the voltage VCOM applied to the common electrode COM by using a polarity reversal signal POL.

The power supply circuit 660 generates various voltages applied to the LCD panel 620 and the voltage VCOM applied to the common electrode COM based on a reference voltage supplied from the outside.

In FIG. 14, the liquid crystal system 610 is configured to include the LCD controller 310. However, the LCD controller 310 may be provided outside the liquid crystal system 610. The host (not shown) may be included in the liquid crystal system 610 together with the LCD controller 310.

At least one of the scan driver 640, the LCD controller 310, and the power supply circuit 660 may be included in the data driver 200.

Figure 15:
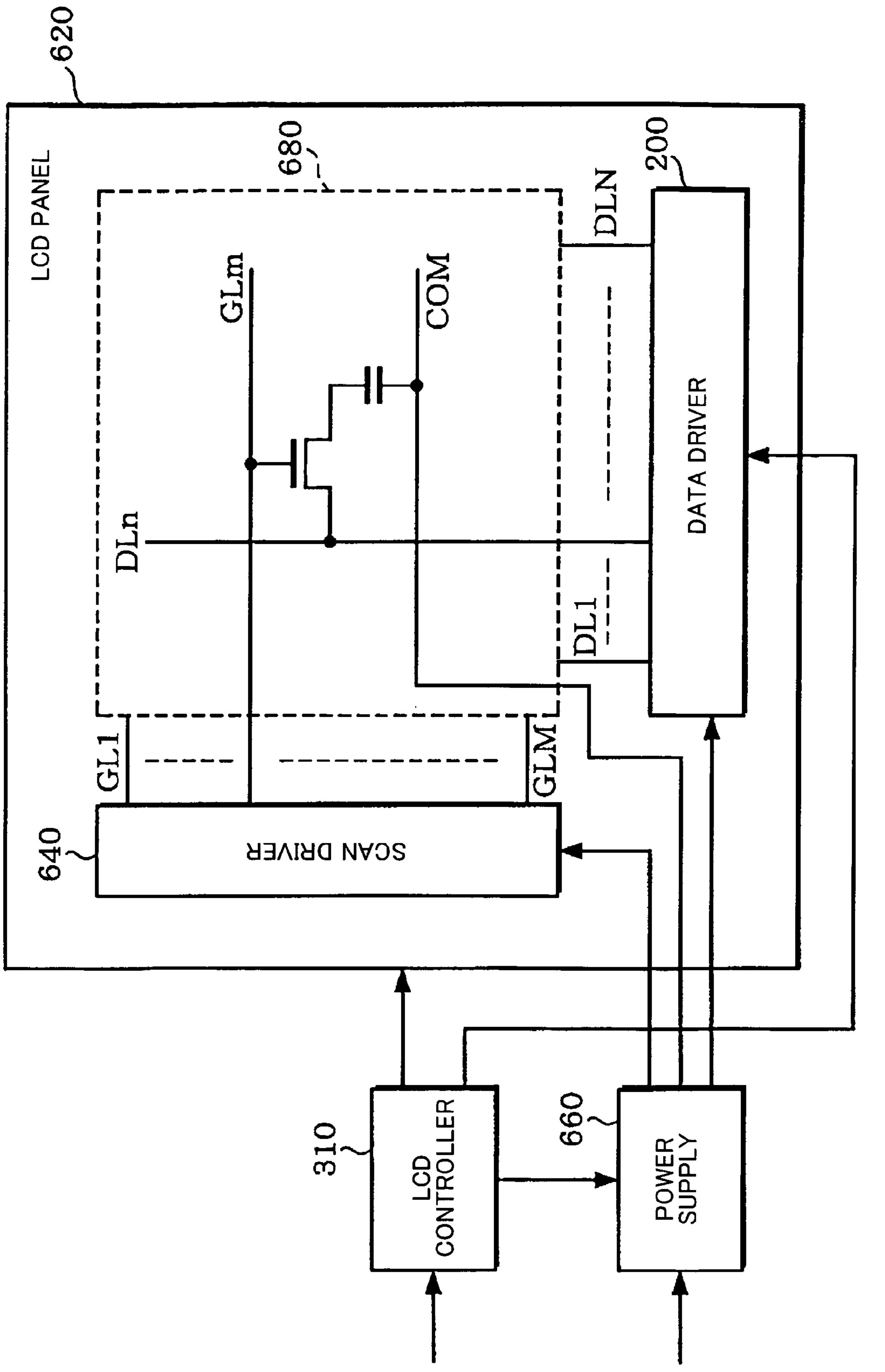
FIG. 15 is a block diagram showing another example of a configuration of a liquid crystal system in an embodiment of the present invention.

Some or all of the data driver 200, the scan driver 640, the LCD controller 310, and the power supply circuit 660 may be formed on the LCD panel 620. In FIG. 15, the data driver 200 and the scan driver 640 are formed on the LCD panel 620. As described above, the LCD panel 620 may be configured to include a plurality of data lines, a plurality of scan lines, a plurality of pixels, each of the pixels being specified by one of the data lines and one of the scan lines, and a display driver which drives the data lines. The pixels are formed in a pixel formation region 680 of the LCD panel 620.

A switch circuit can be formed on the LCD panel 620 by using a low-temperature poly-silicon (hereinafter abbreviated as "LTPS") process. According to the LTPS process, a driver circuit and the like can be directly formed on a panel substrate (glass substrate, for example) on which a pixel including a switching device (TFT, for example) and the like is formed. This reduces the number of parts, whereby the size and weight of the display panel can be reduced. Moreover, LTPS enables the pixel size to be reduced by applying a conventional silicon process technology while maintaining the aperture ratio. Furthermore, LTPS has high charge mobility and small parasitic capacitance in comparison with amorphous silicon (a-Si). Therefore, a charge period of the pixel formed on the substrate can be secured even if the pixel select period for one pixel is reduced due to an increase in the screen size, whereby the image quality can be improved.

Figure 16:
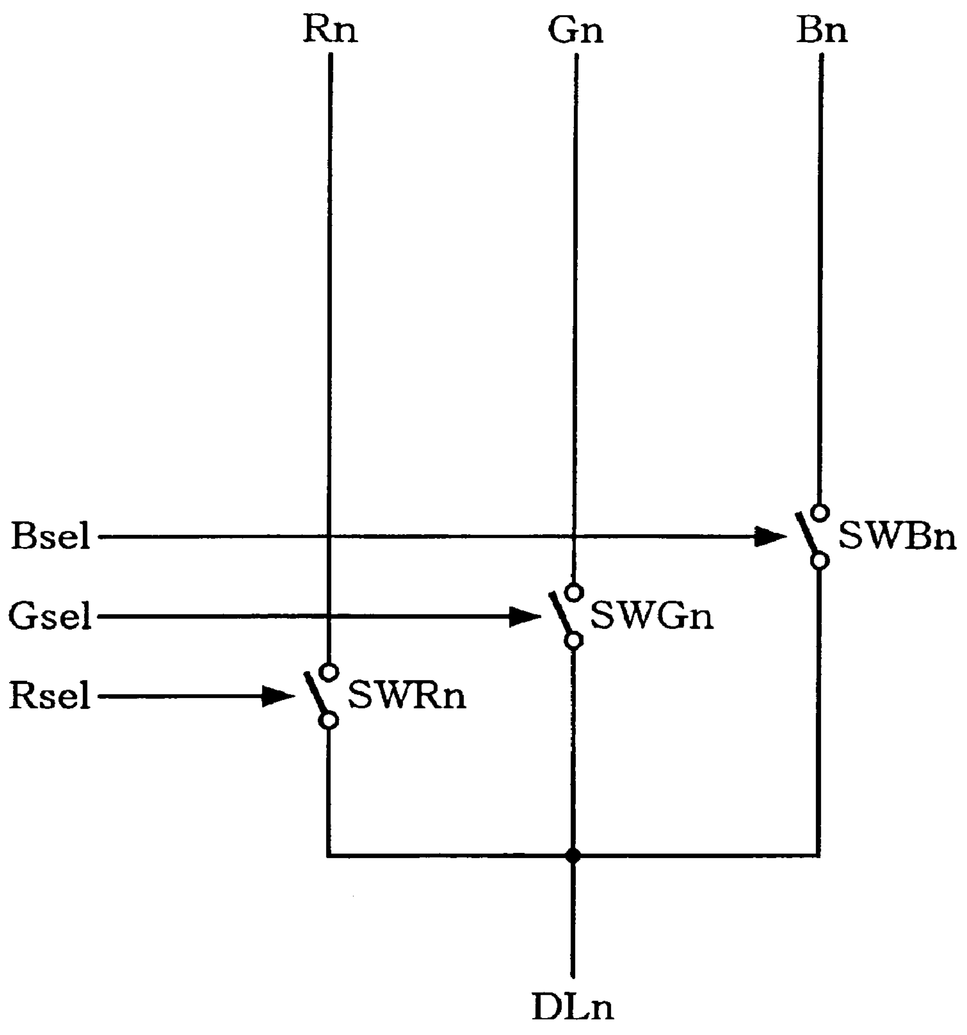
FIG. 16 is a schematic diagram of a data line of an LCD panel formed by using an LTPS process.

FIG. 16 schematically shows a data line DLn of the LCD panel 620 formed by using the LTPS process.

The data line DLn is connected with one of an R component data line Rn, a G component data line Gn, and a B component data line Bn through one of three switching devices SWRn, SWGn, and SWBn. Specifically, the switching devices SWRn, SWGn, and SWBn are exclusively turned on based on a switch control signal for each switching device. The same description also applies to other data lines.

Figure 17:
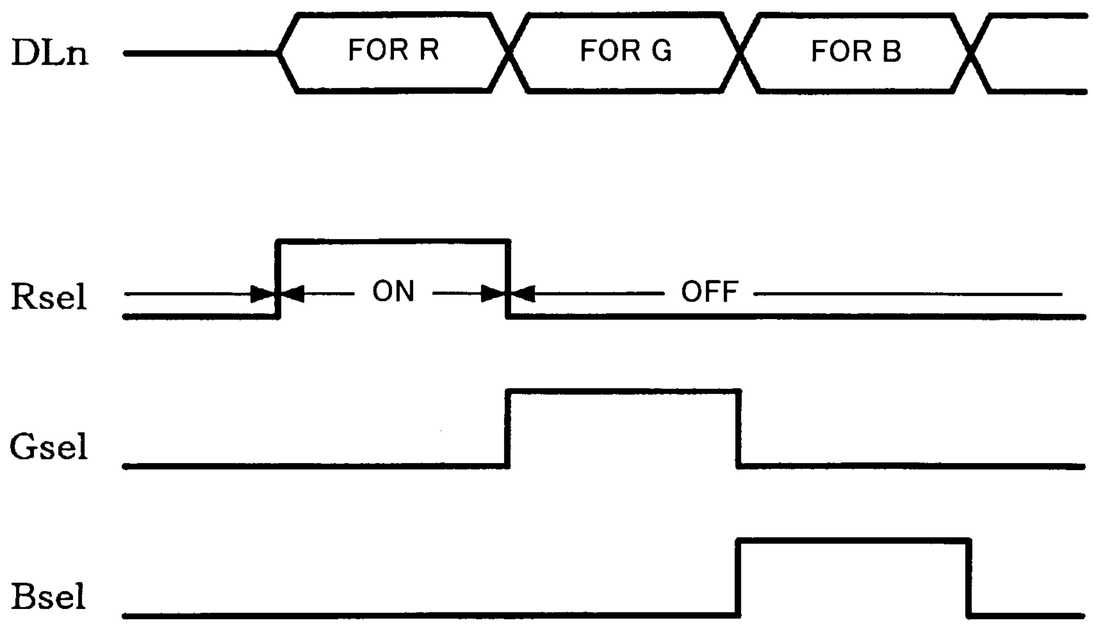
FIG. 17 is a timing diagram of an example of each component data line and a switch control signal for each switching device.

FIG. 17 shows an example of timing of each component data line and the switch control signal for each switching device.

A drive voltage corresponding to R component display data, a drive voltage corresponding to G component display data, and a drive voltage corresponding to B component display data are time-divided and output to the data line DLn.

The drive voltage is supplied to each component data line by turning on the switching devices SWRn, SWGn, and SWBn based on the switch control signals Rsel, Gsel, and Bsel in synchronization with the time-division timing of the data line DLn.

In the data driver 200 in the present embodiment, a control command, which causes timing at which the switch control signals Rsel, Gsel, and Bsel are turned on to differ, is stored in the block of the memory space of the EEPROM 300. The control command in the block is read according to the operation information from the user.

Figure 18:
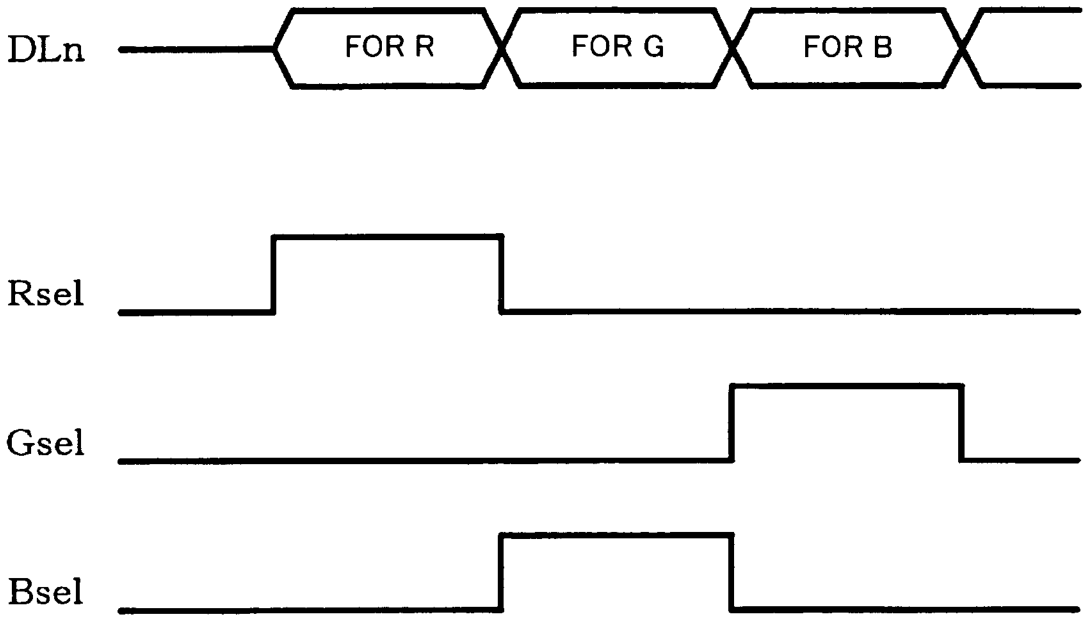
FIG. 18 is a timing diagram of another example of each component data line and a switch control signal for each switching device.

FIG. 18 shows an example in which the timing of the switch control signal for each switching device is changed by using the control command.

In this case, the drive voltages output to the G component data line Gn and the B component data line Bn differ from those shown in FIG. 17. Therefore, the color of the image displayed on the LCD panel 620 can be easily changed.

Various types of display control can be easily realized without applying a load to the LCD controller 310 by storing the control command group in each block of the EEPROM 300 and appropriately changing the block from which the control command is read.

The present invention is not limited to the above-described embodiment. Various modifications and variations are possible within the spirit and scope of the present invention.

Part of requirements of any claim of the present invention could be omitted from a dependent claim which depends on that claim. Moreover, part of requirements of any independent claim of the present invention could be made to depend on any other independent claim.

What is claimed is:

1. A semiconductor device which is controlled based on a control signal corresponding to control data, the semiconductor device comprising:

a control register in which the control data is set;

a sequencer which performs read control of a first control command on a nonvolatile memory in which the first control command is stored;

a first command bus to which the first control command read from the nonvolatile memory is output; and a first decoder which decodes the first control command of the first command bus, wherein the sequencer cyclically performs read control of the first control command on the nonvolatile memory, and sets the control data corresponding to the first control command in the control register each time the first decoder decodes the first control command output to the first command bus, wherein the read control stops and a control command corresponding to control data from a controller is set in the control register, when a stop command from the controller is set.

2. The semiconductor device as defined in claim 1, comprising:

an external setting terminal which is set in a first or second state, wherein the sequencer performs read control of the first control command on the nonvolatile memory when the external setting terminal is set in the first state.

3. The semiconductor device as defined in claim 2, comprising:

a control flag register in which a control flag is set;

a second command bus to which a second control command is output;

a second decoder which decodes the second control command of the second command bus; and a switch circuit which connects one of the first and second command buses with the first decoder, wherein the switch circuit outputs a control command of one of the first and second command buses to the first decoder based on the control flag, and wherein the sequencer sets the control flag in the control flag register based on a decode result of the second decoder, and sets the control data corresponding to the control command of one of the first and second command buses in the control register based on a decode result of the first decoder.

4. The semiconductor device as defined in claim 3, wherein the switch circuit switches a connection setting of the switch circuit from a state in which the switch circuit connects the first command bus with the first decoder to a state in which the switch circuit connects the second command bus with the first decoder, on condition that the control flag is set or reset based on the decode result of the second decoder.

5. The semiconductor device as defined in claim 4, wherein the switch circuit connects the second command bus with the first decoder when the second decoder detects that the second control command is output to the second command bus.

6. The semiconductor device as defined in claim 3, wherein the switch circuit connects the second command bus with the first decoder when the second decoder detects that the second control command is output to the second command bus.

7. The semiconductor device as defined in claim 1, comprising:

a control flag register in which a control flag is set;

a second command bus to which a second control command is output;

a second decoder which decodes the second control command of the second command bus; and a switch circuit which connects one of the first and second command buses with the first decoder, wherein the switch circuit outputs a control command of one of the first and second command buses to the first decoder based on the control flag, and wherein the sequencer sets the control flag in the control flag register based on a decode result of the second decoder, and sets the control data corresponding to the control command of one of the first and second command buses in the control register based on a decode result of the first decoder.

8. The semiconductor device as defined in claim 7, wherein the switch circuit switches a connection setting of the switch circuit from a state in which the switch circuit connects the first command bus with the first decoder to a state in which the switch circuit connects the second command bus with the first decoder, on condition that the control flag is set or reset based on the decode result of the second decoder.

9. The semiconductor device as defined in claim 8, wherein the switch circuit connects the second command bus with the first decoder when the second decoder detects that the second control command is output to the second command bus.

10. The semiconductor device as defined in claim 7, wherein the switch circuit connects the second command bus with the first decoder when the second decoder detects that the second control command is output to the second command bus.

11. The semiconductor device as defined in claim 1, wherein the first command bus is electrically connected with the nonvolatile memory.

12. The semiconductor device as defined in claim 1, wherein the second command bus is connected with a controller which outputs the second control command.

13. The semiconductor device as defined in claim 1, wherein the nonvolatile memory is an electrically erasable programmable read only memory (EEPROM).

14. The semiconductor device as defined in claim 1, comprising:

a display data register in which display data is fetched; and a data line driver circuit which drives a data line of a display section based on the display data fetched in the display data register, wherein a display setting control command is stored in the nonvolatile memory, and wherein the second command bus is connected with a display controller which outputs the second control command.

15. An electronic instrument comprising the semiconductor device as defined in claim 1.

16. A method for controlling a semiconductor device based on a control signal corresponding to control data, the method comprising:

cyclically performing read control of a first control command on a nonvolatile memory in which the first control command is stored;

setting the control data corresponding to the first control command in a control register each time the first control command read from the nonvolatile memory is decoded;

stopping the read control when a stop command from the controller is set;

setting a control command, using the controller, corresponding to control data in the control register; and generating the control signal based on a content of the control register.

17. The method for controlling a semiconductor device as defined in claim 16, wherein read control of the first control command on the nonvolatile memory is performed when an external setting terminal is set in a first state.

18. The method for controlling a semiconductor device as defined in claim 17, the method comprising:

decoding a first control command;

decoding a second control command;

decoding a control command of one of the first and second command buses corresponding to a control flag which is set based on a decode result of the second control command, the first control command being output to the first command bus and the second control command being output to the second command bus; and setting in the control register the control data corresponding to a control command of one of the first and second command buses.

19. The method for controlling a semiconductor device as defined in claim 16, the method comprising:

decoding a first control command;

decoding a second control command;

decoding a control command of one of the first and second command buses corresponding to a control flag which is set based on a decode result of the second control command, the first control command being output to the first command bus and the second control command being output to the second command bus; and setting in the control register the control data corresponding to a control command of one of the first and second command buses.

* * * * *